United States Patent [19]

Simon et al.

[11] 3,862,135

[45] Jan. 21, 1975

[54] AMINOACYLOCTAHYDROMORPHAN-THRIDINES

[76] Inventors: Edward Simon, 4 Andrews Pl., East Brunswick, N.J. 08904; David B. Reisner, 68 Meadow Dr., Hightstown, N.J. 08520; John F. Schaefer, 624 Paxson Ave., Mercerville, N.J. 08619; Bernard J. Ludwig, 1159 Stockton Pl., North Brunswick, N.J. 08540; Frank M. Berger, 145 Constitution Dr., Princeton, N.J. 08540

[22] Filed: Jan. 19, 1973

[21] Appl. No.: 325,172

[52] U.S. Cl....260/239 D, 260/247.5 H, 260/268 TR, 260/293.59, 424/244, 424/248, 424/250, 424/267
[51] Int. Cl....C07d 41/08, C07d 57/00, C07d 99/02

[58] Field of Search.. 260/239 D, 247.5 R, 247.5 H, 260/268 TR, 293.59

[56] References Cited
FOREIGN PATENTS OR APPLICATIONS
834,281  5/1960  Great Britain............... 260/247.5 H

*Primary Examiner*—Alton D. Rollins
*Attorney, Agent, or Firm*—Kevin B. Clarke

[57] ABSTRACT

Novel N-substituted octahydromorphanthridines which exhibit antihypertensive activity are prepared by reacting octahydromorphanthridines with suitable halogenoalkanoic acid halides with or without the presence of an acid acceptor, followed by reaction of the halogenoalkanoic amides thus produced with ammonia or an amine.

20 Claims, No Drawings

AMINOACYLOCTAHYDROMORPHANTHRIDINES

This invention relates to a new class of N-substituted octahydromorphanthridines having the following structural formula:

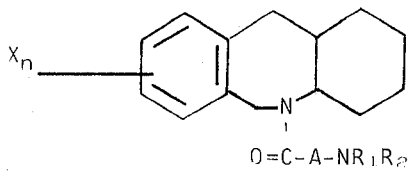

Wherein X is hydrogen, chlorine or lower alkyl; $n$ is 1 or 2; A is lower alkylene; $R_1$ and $R_2$ are hydrogen or lower alkyl, or $R_1$ and $R_2$ taken together with the nitrogen atom to which they are attached are 5- or 6-membered heterocyclic ring systems. AS used throughout this specification and claims, the terms lower alkyl and lower alkylene are intended to encompass carbon chains of 1–6 carbon atoms. These compounds can exist and can be used in the form of the free base or an acid addition salt thereof with a pharmacologically acceptable acid such as hydrochloric, phosphoric, sulfuric, tartaric and the like. The preparation of the compounds of the invention is carried out by reacting an octahydromorphanthridine with a suitable halogenoalkanoic acid halide with or without the presence of an acid acceptor. The resulting halogenoalkanoyloctahydromorphanthridine is then reacted with ammonia or the appropriate amine to obtain the desired compound. The reactions involved are as follows:

wherein X is hydrogen, chlorine or lower alkyl; $n$ is 1 or 2, $Z_1$ and $Z_2$ are halogen; A is lower alkylene; $R_1$ and $R_2$ are hydrogen or lower alkyl, or $R_1$ and $R_2$ taken together with the nitrogen atom to which they are attached are 5- and 6-membered heterocyclic ring systems.

Compounds of the invention wherein X is chlorine may be prepared by chlorination of a 5-(halogenoalkanoyl) octahydromorphanthridine and treating the product of this reaction with ammonia or a suitable amine.

The acid addition salts of the novel compounds of the invention are prepared by treating the free base with a pharmacologically acceptable acid in a suitable solvent.

Table 1, which follows, sets forth the physical characteristics of a representative number of the novel compounds.

In order to determine the antihypertensive activity of the compounds of this invention, representative members of the series of compounds were administered to spontaneous hypertensive rats in a single dose and their effect on the systolic blood pressure determined.

In addition, the effect of compound number 4, on renal hypertensive dogs was also determined. In this study the dogs were administered the compound chronically for a period of 5 days and the antihypertensive effect measured.

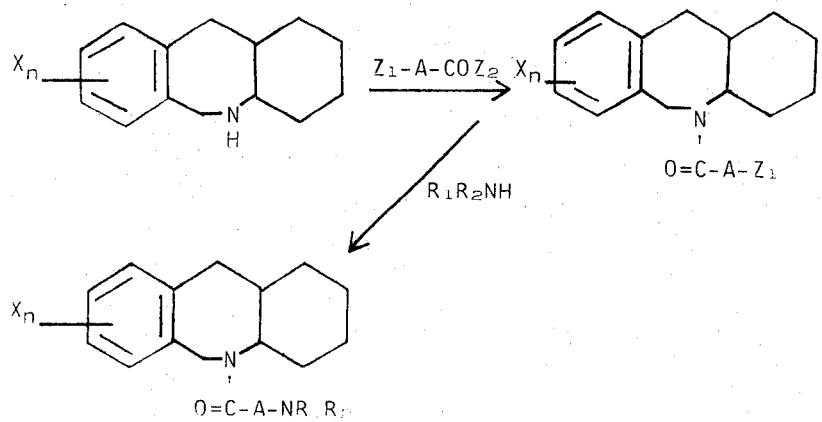

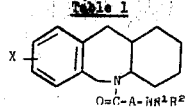

Table 1

| Cpd. No. | X | A | $NR^1R^2$ | Salt | Recryst. Solvent | Mp, °C | Formula | Carbon Calcd. | Carbon Found | Hydrogen Calcd. | Hydrogen Found | Nitrogen Calcd. | Nitrogen Found | Chlorine Calcd. | Chlorine Found |
|---|---|---|---|---|---|---|---|---|---|---|---|---|---|---|---|
| 1 | H | $CH_2$ | $NHCH_3$ | HCl | EtOH | 287-289 | $C_{17}H_{26}ClN_2O$ | 66.13 | 66.36 | 8.10 | 8.22 | 9.08 | 9.08 | 11.51 | 11.62 |
| 2 | H | $CH_2$ | $NH(i-C_3H_7)$ | HCl | EtOH-Et$_2$O | 223-225 | $C_{19}H_{29}ClN_2O$ | 67.76 | 67.65 | 8.62 | 8.66 | 8.32 | 8.19 | 10.55 | 10.61 |
| 3 | H | $CH_2$ | $N(CH_3)_2$ | - | $CHCl_3$-Hexane | 110-112 | $C_{18}H_{26}N_2O$ | 75.45 | 75.76 | 9.15 | 9.11 | 9.78 | 9.90 | | |
| 4 | H | $CH_2$ | $N(CH_3)_2$ | HCl | Me$_2$CO | 233-235 | $C_{18}H_{27}ClN_2O$ | 66.96 | 66.64 | 8.43 | 8.51 | 8.68 | 8.61 | 10.98 | 11.01 |
| 5 | H | $CH_2$ | $NH(n-C_4H_9)$ | HCl | EtOH-Et$_2$O | 224-226 | $C_{20}H_{31}ClN_2O$ | 68.44 | 68.08 | 8.90 | 8.60 | 7.98 | 7.72 | 10.16 | 10.11 |
| 6 | H | $CH_2$ | $N(C_2H_5)_2$ | - | Hexane | 85-87 | $C_{20}H_{30}N_2O$ | 76.39 | 76.34 | 9.62 | 9.76 | 8.91 | 8.88 | | |
| 7 | H | $CH_2$ | N(pyrrolidinyl) | - | 1-Pr$_2$O | 129-130 | $C_{21}H_{30}N_2O$ | 77.25 | 77.10 | 9.26 | 9.13 | 8.58 | 8.57 | | |
| 8 | H | $CH_2$ | N(morpholinyl) | - | 1-Pr$_2$O | 152-155 | $C_{20}H_{28}N_2O_2$ | 73.13 | 72.96 | 8.59 | 8.57 | 8.53 | 8.37 | | |
| 9 | H | $CH_2$ | N(N-methylpiperazinyl) | - | Hexane | 97-99 | $C_{21}H_{31}N_3O$ | 73.86 | 74.20 | 9.15 | 9.20 | 12.31 | 12.12 | | |
| 10 | 9-Cl | $CH_2$ | $N(CH_3)_2$ | HCl | MeCN | 242-245 | $C_{18}H_{26}Cl_2N_2O$ | 60.51 | 60.30 | 7.33 | 7.37 | 7.87 | 7.74 | 19.84 | 20.06 |
| 11 | H | $CH_2CH_2$ | $N(CH_3)_2$ | - | Et$_2$O-Hexane | 74-76 | $C_{19}H_{28}N_2O$ | 75.95 | 75.79 | 9.39 | 9.27 | 9.33 | 9.27 | | |
| 12 | H | $CH(CH_3)$ | $N(CH_3)_2$ | HCl | MeOH-Et$_2$O | 256-258 | $C_{19}H_{29}ClN_2O$ | 67.74 | 67.72 | 8.68 | 9.01 | 8.31 | 8.03 | 10.52 | 10.49 |
| 13 | 7,9-diCl | $CH_2$ | $N(CH_3)_2$ | HCl | MeOH-Et$_2$O | 284-286 | $C_{18}H_{25}Cl_3N_2O$ | 55.19 | 55.16 | 6.43 | 6.41 | 7.15 | 7.01 | 27.15 | 27.37 |
| 14 | 8-CH$_3$ | $CH_2$ | $N(CH_3)_2$ | - | Hexane | 133-135 | $C_{19}H_{28}N_2O$ | 75.96 | 75.68 | 9.39 | 9.99 | 9.32 | 9.25 | | |
| 15 | H | $CH_2$ | $NH_2$ | HCl | EtOH-Et$_2$O | 182-192 | $C_{16}H_{23}ClN_2O$ | 63.71 | 63.61 | 8.20 | 8.54 | 9.90 | 10.09 | 12.53 | 12.28 |
| 16 | H | $CH_2CH(CH_3)$ | $N(CH_3)_2$ | HCl | MeOH-Et$_2$O | 236-239 | $C_{20}H_{31}ClN_2O$ | 68.45 | 68.37 | 8.90 | 8.98 | 7.98 | 7.82 | 10.10 | 10.01 |

EXAMPLE 1

Preparation of 1,2,3,4,4a,5,6,11a-octahydromorphanthridine

A mixture of 500 g (2.56 moles) of 5,6-dihydromorphanthridine, 10 g of platinum dioxide and 1400 ml of glacial acetic acid was hydrogenated in a stirring autoclave at ambient temperature and initial pressure of 500 pounds. After absorption of 2400 pounds of hydrogen, the solution was filtered and the acetic acid was removed under reduced pressure. The residual semisolid was dissolved in 2 l. of water, 15 g of charcoal was added and the mixture was filtered through diatomaceous earth. The filtrate was made strongly basic with potassium hydroxide, cooled and extracted into 3 l. of pentane. The pentane solution was dried over calcium sulfate, concentrated to 1 l., chilled in a freezer overnight and filtered, yielding 350 g of 1,2,3,4,4a,5,6,11a-octahydromorphanthridine, mp 45°–50°C. This material was used in the next reaction without further purification. A sample prepared for analysis by recrystallization from pentane melted at 51°–52.5°C.

Anal. Calcd. for $C_{14}H_{19}N$: C, 83.53; H, 9.51; N, 6.96. Found: C, 83.32; H, 9.60; N, 6.98.

EXAMPLE 2

Preparation of 5-chloroacetyl-1,2,3,4,4a,5,6,11a-octahydromorphanthridine

A solution of 300 g (1.49 moles) of 1,2,3,4,4a,5,6,11a-octahydromorphanthridine in 600 ml of chloroform was cooled in an ice bath and stirred. 185 g (1.64 moles) of chloroacetyl chloride in 200 ml of chloroform was added dripwise over a period of 1.5 hours. The resultant solution was stirred and heated at reflux for 2 hours and then poured onto 1 kg of ice. The chloroform was separated and washed 3 times with water, dried over calcium sulfate and evaporated to a residual semisolid. On triturating with ethyl acetate, a crystalline product weighing 305 g was obtained. After recrystallization from ethanol, the purified product melted at 142°–144°C.

Anal. Calcd. for $C_{16}H_{20}ClNO$: C, 69.16; H, 7.24; Cl, 12.76; N, 5.04. Found: C 69.31; H, 7.40; Cl, 12.57; N, 5.12.

EXAMPLE 3

Preparation of 5-(3-chloropropionyl)-1,2,3,4,4a,5,6,11a-octahydromorphanthridine To 7 g (0.035 mole) of 1,2,3,4,4a,5,6,11a-octahydromorphanthridine in 100 ml of refluxing acetone, 2.3 g (0.017 mole) of 3-chloropropionyl chloride was added dropwise over a period of 30 minutes. The mixture was cooled for 1 hour and filtered. The filtrate was concentrated to dryness in vacuo and ethanol was added to the residual oil whereupon crystallization occurred. Recrystallization from ethanol gave a product melting at 129°–130°C.

Anal. Calcd. for $C_{17}H_{22}ClNO$: C, 69.98; H, 7.55; Cl, 12.18; N, 4.80; O, 5.49. Found: C, 69.87; H, 7.54; Cl, 12.40; N, 4.68; O, 5.61.

EXAMPLE 4

Preparation of 5-(2-bromopropionyl)-1,2,3,4,4a,5,6,11a-octahydromorphanthridine

To a mixture of 15 g (0.075 mole) of 1,2,3,4,4a,5,6,11a-octahydromorphanthridine, 31.3 g (0.295 mole) of anhydrous sodium carbonate was added dropwise with stirring a solution of 14.1 g (0.082 mole) of 2-bromopropionyl chloride in 25 ml of toluene. The resulting mixture was stirred vigorously and heated at reflux for 3 hours and then filtered. The filtrate was poured into ice-water containing dilute hydrochloric acid. The organic layer was separated, washed with water, dried and evaporated to dryness. The residual oil was triturated with acetone giving 13 g of crystalline material which was recrystallized from methyl ethyl ketone. The product (10 g) melted at 147°–149°C.

Anal. Calcd. for $C_{17}H_{22}BrNO$: C, 60.72; H, 6.60; Br, 23.76; N, 4.17. Found: C, 60.92; H, 6.69; Br, 23.78; N, 4.15.

EXAMPLE 5

Preparation of 5-(3-chlorobutyryl)-1,2,3,4,4a,5,6,11a-octahydromorphanthridine 5 g (0.025 mole) of 1,2,3,4,4a,5,6,11a-octahydromorphanthridine was converted to 5 g of 5-(3-chlorobutyryl)1,2,3,4,4a,5,6,11a-octahydromorphanthridine by the procedure given in Example 4. The product recrystallized from isopropyl ether melted at 117°–119°C.

Anal. Calcd. for $C_{18}H_{24}ClNO$: C, 70.69; H, 7.91; Cl, 11.59; N, 4.58. Found: C, 70.95; H, 7.90; Cl, 11.60; N, 4.61.

The following example illustrates the preparation of the free bases 3, 6, 7, 8, 9 and 11 in Table 1.

EXAMPLE 6

Preparation of 5-dimethylaminoacetyl-1,2,3,4,4a,5,6,11a-octahydromorphanthridine 50 ml of a 40 percent solution of dimethylamine in water was added to a slurry of 40.6 g (0.146 mole) of 5-chloroacetyl-1,2,3,4,4a,5,6,11a-octahydromorphanthridine in 30 ml of ethanol. The mixture was heated at reflux for 1 hour and then concentrated to dryness under reduced pressure. The gummy residue was partitioned between benzene and 10 percent hydrochloric acid. The aqueous layer was separated, charcoaled, made strongly basic with potassium hydroxide, and extracted with 3 portions of chloroform. The organic solutions were combined, washed with water, dried over calcium sulfate and evaporated to dryness. The residual oil was triturated with 150 ml of hexane. On standing, crystals formed, yielding 38.5 g of product melting at 109°–111°C. Recrystallization from a mixture of chloroform and hexane with the aid of charcoal gave 33.5 g of purified product.

EXAMPLE 7

Preparation of 5-dimethylaminoacetyl-1,2,3,4,4a,5,6,11a-octahydromorphanthridine hydrochloride 40.6 g (0.146 mole) of 5-chloroacetyl-1,2,3,4,4a,5,6,11a-octahydromorphanthridine and 50 ml of 40 percent dimethylamine in water were reacted as described in Example 4. The product was extracted into 10 percent hydrochloric acid and the acidic solution was washed with benzene, charcoaled and made strongly basic with potassium hydroxide. The aqueous solution was extracted several times with trichloroethylene. The trichloroethylene solution was washed with water, dried over calcium sulfate and treated with dry hydrogen chloride. The solid was removed by filtration and washed with trichloroethylene and then anhydrous ether. The hydrochloride, after drying at 100°–120°C, weighed 37.1 g and melted at 218°–220°C. Recrystallization from acetone raised the melting point to 233°–235°C.

EXAMPLE 8

The following example is a general procedure employed in the preparation of the hydrochlorides 1, 2, 4, 5, 10, 12, and 16 in Table 1 from their bases.

The base obtained as described in Example 6 was dissolved in methanol and the solution was treated with dry hydrogen chloride gas until the resulting solution reached pH 2. Anhydrous ethyl ether was added to the cloud point and mixture was allowed to stand. The crystals were removed by filtration, dried in an oven at 120°C and then recrystallized.

EXAMPLE 9

Preparation of 5-dimethylaminoacetyl-1,2,3,4,4a,5,6,11a-octahydromorphanthridine sulfate 5-Dimethylaminoacetyl-1,2,3,4,4a,5,6,11a-octahydromorphanthridine (1 g) prepared as described in Example 6 was dissolved in 20 ml of isopropanol, solution was cooled and 5 drops of concentrated sulfuric acid was added with shaking. An oil formed which was separated from the liquid by decantation. Trituration of the oil with ether induced crystallization. The solid after recrystallization from isopropanol melted at 205°–208°C.

Anal. Calcd. for $C_{18}H_{28}N_2O_5S$: C, 56.24; H, 7.34; N, 7.29; S, 8.31. Found: C, 56.32; H, 7.03; N. 7.10; S, 8.29.

EXAMPLE 10

Preparation of 9-chloro-5-chloroacetyl-1,2,3,4,4a,5,6,11a-octahyromorphanthridine Chlorine gas (2.5 g, 0.036 mole) was bubbled into a cold solution of 10 g (0.036 mole) of 5-chloroacetyl-1,2,3, 4,4a,5,6,11a-octahydromorphanthridine and 2 g (0.0123 mole) of ferric chloride in chloroform. The solution was allowed to stand overnight at room temperature, water was added and the organic layer was separated, dried and evaporated to dryness. The residual gum crystallized on triturating with methanol. The solid was recrystallized from methanol to yield 6 g of 9-chloro-5-chloroacetyl-1,2,3,4,4a,5,6,11a-octahydromorphanthridine, mp 148°–150°C.

Anal. Calcd. for $C_{16}H_{19}Cl_2NO$: C, 61.55; H, 6.13; Cl, 22.71; N, 4.49. Found: C, 61.59; H, 6.19; Cl, 22.60; N, 4.70.

EXAMPLE 11

Preparation of 7,9-dichloro-5-chloroacetyl-1,2,3,4,4a,5,6,11a-octahydromorphanthridine The chlorination of 5-chloroacetyl-1,2,3,4,4a,5,6,11a-octahydromorphanthridine was carried out as described in Example 10 except that the reaction mixture was allowed to stand for 48 hours instead of 24 hours. Water was added to the mixture and the chloroform solution was separated, dried and evaporated to dryness. Anhydrous ethyl ether was added to the residual oil and on standing crystallization occurred. The crystals were removed and recrystallized from methanol. The product melted at 146°–148°C.

Anal. Calcd. for $C_{16}H_{18}Cl_3NO$: C, 55.44; H, 5.23; Cl, 30.68; N, 4.04. Found: C, 55.13; H, 5.32; Cl, 30.54; N, 3.91.

EXAMPLE 12

Preparation of 7,9-dichloro-5-dimethylaminoacetyl-1,2,3,4,4a,5,6,11a-octahydromorphanthridine hydrochloride 3 g of 7,9-dichloro-5-chloroacetyl-1,2,3,4,4a,5,6,11a-octahydromorphanthridine was allowed to react with 5 ml of a 40 percent solution of dimethylamine as described in Example 6. The ethanol was removed by distillation and 10 percent hydrochloric acid was added until pH 2 was reached. The crystals that formed were removed by filtration. The salt was then recrystallized.

EXAMPLE 13

Preparation of 5-aminoacetyl-1,2,3,4,4a,5,6,11a-octahydromorphanthridine hydrochloride This compound was prepared according to the method described in Example 12 using aqueous ammonia in place of aqueous dimethylamine.

EXAMPLE 14

Preparation of 8-methyl-1,2,3,4,4a,5,6,11a-octahydromorphanthridine acetate

8-Methylmorphanthridin-6(5H)-one (4.2 g) was mixed with 20 ml of a 70 percent solution of sodium bis(2-methoxyethoxy)aluminum hydride in toluene and 50 ml of benzene. The mixture was stirred and heated on a steam bath for 2 hours and then treated with 100 ml of 10 percent aqueous sodium hydroxide. The resulting mixture was extracted with ether and the organic solution was washed with water, dried, and evaporated to dryness yielding 4 g of crude 8-methyl-5,6-dihydromorphanthridine. The solid recrystallized from methanol melted at 113°–115°C. The purified solid (1.3 g) was dissolved in 150 ml of glacial acetic acid and hydrogenated in the pressence of platinum oxide in a Parr Hydrogenation Apparatus. The mixture was filtered, concentrated in vacuo and the residue was recrystallized from acetone. The acetic acid salt melted at 130°–132°C.

Anal. Calcd. for $C_{17}H_{25}NO_2$: C, 74.14; H, 9.15; N, 5.09. Found: C, 73.63; H, 8.92; N, 4.72.

EXAMPLE 15

Preparation of 5-dimethylaminoacetyl-8-methyl-1,2,3,4,4a,5,6,11a-octahydromorphanthridine To 1.5 g of 8-methyl-1,2,3,4,4a,5,6,11a-octahydromorphanthridine acetate in 50 ml of chloroform containing 50 g of anhydrous potassium carbonate, was added 5 ml of chloroacetyl chloride and the mixture was stirred at room temperature overnight. The solid was removed by filtration and the chloroform solution was washed with water, dried, and evaporated to dryness. The residue was mixed with 50 ml of methanol containing 25 ml of a 40 percent solution of dimethylamine and the solution was heated under reflux for 1 hour. The solution was concentrated to dryness and solid was recrystallized from hexane to yield 0.7 g of 5-dimethylaminoacetyl-8-methyl-1,2,3,4,4a,5,6,11a-octahydromorphanthridine, mp 133°–135°C.

The Effect of Substituted Octahydromorphanthridines on Systolic Arterial Blood Pressure in Spontaneous Hypertensive Rats Male, spontaneous hypertensive rats (150–200 g, Purina laboratory animals) were anesthetized with sodium pentobarbital (1 percent, 0.1 ml/100 g body weight).

Systolic blood pressure was measured from the tail artery with an occluding cuff, a pneumatic pressure transducer and Physiograph recorder. Systolic blood pressure was recorded before administration and at 0.5, 1, 2 and 4 hours after administration. The effect of representative compounds of the invention on systolic blood pressure of spontaneous hypertensive rats is summarized in the following table. The compounds were dissolved or suspended in 1 percent acacia solution and were administered orally in a dose of 25 mg/kg. Each of the compounds evaluated produced a significant decrease in the systolic arterial blood pressure of the test animals.

small bore, spirally cut tygon tubing around the artery. The tubing is secured in place by a ligature tied tightly around the tubing. Baseline blood pressure was determined once a day on each of the two days immediately preceeding the initiation of placebo or drug administration. Compound 4, 5 mg/kg, in a gelatin capsule without any filler, was orally administered to renal hypertensive dogs twice a day for five days. The blood pressure of these dogs was determined immediately before dosing with placebo or Compound 4. The effect of placebo and this compound on the systolic and diastolic blood pressure of renal hypertensive dogs is shown in Table 3.

Table 2

Systolic Blood Pressure after Drug Administration

| Cpd. | Animals | Hours | | | | |
|---|---|---|---|---|---|---|
| | | 0 | 0.5 | 1.0 | 2.0 | 4.0 |
| 2 | 8 | 192 ±12 | 183 ± 8 | 156 ± 7 | 166 ±3 | 171 ±6 (4)* |
| 3 | 13 | 187 ± 7 | 167 ±13 | 148 ± 5 | 156 ±9 | 175 ±4 (5)* |
| 4 | 4 | 212 ±11 | 183 ± 6 | 179 ± 2 | 177 ±3 | — |
| 5 | 4 | 168 ± 8 | — | 148 ±10 | 164 ±6 | 145 ±4 (4)* |
| 7 | 9 | 180 ± 3 | — | 156 ± 5 | 179 ±2 | 168 ±8 (4)* |
| 8 | 4 | 225 ± 4 | 196 ±10 | 185 ± 9 | 185 ±7 | — |
| 9 | 4 | 221 ± 4 | 208 ± 8 | 174 ± 7 | 215 ±6 | — |
| 11 | 8 | 198 ± 8 | 116 ± 7 | 146 ± 6 | 158 ±6 | 181 ±3 (4)* |

Blood pressure is mm Hg and the values are the mean ± the standard error of the mean; *number of animals at 4 hr.

Table 3

EFFECT OF ORAL ADMINISTRATION OF 5 mg/kg BID FOR FIVE DAYS ON THE BLOOD PRESSURE OF RENAL HYPERTENSIVE DOGS

| DRUG | NUMBER OF DOGS | BASELINE | BASELINE | BLOOD PRESSURE - mm Hg. ± STANDARD ERROR - SYSTOLIC/DIASTOLIC ON DAY | | | | | | | | | |
|---|---|---|---|---|---|---|---|---|---|---|---|---|---|
| | | | | 1 A.M. | 1 P.M. | 2 A.M. | 2 P.M. | 3 A.M. | 3 P.M. | 4 A.M. | 4 P.M. | 5 A.M. | 5 P.M. |
| Placebo | 4 | 203±3 | 201±3 | 199±4 | 196±3 | 196±2 | 203±5 | 213±3 | 219±2 | 212±1 | 205±3 | 204±3 | 201±3 |
| | | 120±2 | 119±2 | 119±1 | 120±1 | 119±1 | 122±1 | 115±4 | 119±2 | 119±2 | 117±1 | 119±1 | 119±1 |
| Compd. 4 | 4 | 190±2 | 119±2 | 201±4 | 196±2 | 178±3 | 181±3 | 178±3 | 176±2 | 168±3 | 170±4 | 170±2 | 170±2 |
| | | | | 114±2 | 116±2 | 106±2 | 104±2 | 98±3 | 95±2 | 90±2 | 88±3 | 89±3 | 95±3 |
| P | | | | 0.01 | 0.01 | 0.001 | 0.001 | 0.001 | 0.001 | 0.001 | 0.001 | 0.001 | 0.001 |
| | | | | 0.01 | 0.001 | 0.001 | 0.001 | 0.001 | 0.001 | 0.001 | 0.001 | 0.001 | 0.001 |

The Effect of a Substituted Octahydromorphanthridine (Compound No. 4) on Systolic and Diastolic Arterial Blood Pressure in Renal Hypertensive Dogs Male mongrel dogs are pre-trained to lie quietly on a table while their blood pressure — systolic/diastolic — is determined with a sphygmomanometer using their right hind leg for convenience and consistency. These dogs are then placed in a hypertensive state by a surgical procedure described by Goldblatt, et al., [J. Experimental Medicine 59, 347 (1934)] which consists, in brief, of a right nephrectomy and a constriction of the left renal artery by placing a short length (5 mm) of a

What is claimed is:

1. A compound selected from the group consisting of compounds of the formula:

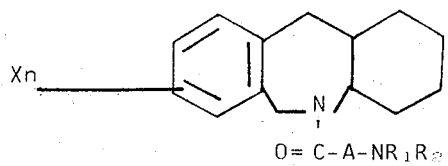

and pharmaceutically accepted salts thereof wherein X is hydrogen, chlorine or lower alkyl; $n$ is 1 or 2; A is lower alkylene; $R_1$ and $R_2$ are hydrogen or lower alkyl, or $R_1$ and $R_2$ taken together with the nitrogen atom to which they are attached are morpholino, piperidino or 4 methylpiperazino ring systems.

2. A compound according to claim 1 wherein X is hydrogen, chlorine or lower alkyl; $n$ is 1 or 2; A is methylene; $R_1$ and $R_2$ are methyl groups.

3. A compound according to claim 1 wherein X is hydrogen; A is lower alkylene; $R_1$ and $R_2$ are methyl groups.

4. A compound according to claim 1 wherein X is hydrogen; A is methylene; $R_1$ and $R_2$ are hydrogen or lower alkyl, or $R_1$ and $R_2$ taken together with the nitrogen atom to which they are attached are morpholino, piperidino or 4 methylpiperazino ring systems.

5. 5-(Methylaminoacetyl)-1,2,3,4,4a,5,6,11a-octahydromorphanthridine hydrochloride 6. 5-(Isopropylaminoacetyl)-1,2,3,4,4a,5,6,11a-octahydromorphanthridine hydrochloride 7. 5-(Dimethylaminoacetyl)-1,2,3,4,4a,5,6,11a-octahydromorphanthridine 8. 5-(Dimethylaminoacetyl)-1,2,3,4,4a,5,6,11a-octahydromorphanthridine hydrochloride 9. 5-(s-Butylaminoacetyl)-1,2,3,4,4a,5,6,11a-octahydromorphanthridine hydrochloride 10. 5-Diethylaminoacetyl-1,2,3,4,4a,5,6,11a-octahydromorphanthridine 11. 5-Piperidinoacetyl-1,2,3,4,4a,5,6,11a-octahydromorphanthridine 12. 5-(Morpholinoacetyl)-1,2,3,4,4a,5,6,11a-octahydromorphanthridine 13. 5-(4-Methyl-1-piperazineacetyl)-1,2,3,4,4a,5,6,11a-octahydromorphanthridine 14. 9-Chloro-5-dimethylaminoacetyl-1,2,3,4,4a,5,6,11a-octahydromorphanthridine hydrochloride 15. 5-(3-Dimethylaminopropionyl)-1,2,3,4,4a,5,6,11a-octahydromorphanthridine 16. 5-(b 2-Dimethylaminopropionyl)-1,2,3,4,4a,5,6,11a-octahydromorphanthridine hydrochloride 17. 7,9-Dichloro-5-dimethylaminoacetyl-1,2,3,4,4a,5,6,11a-octahydromorphanthridine hydrochloride 18. 5-Dimethylaminoacetyl-8-methyl-1,2,3,4,4a,5,6,11a-octahydromorphanthridine 19. 5-Aminoacetyl-1,2,3,4,4a,5,6,11a-octahydromorphanthridine hydrochloride 20. 5-(3-Dimethylaminobutyryl)-1,2,3,4,4a,5,6,11a-octahydromorphanthridine hydrochloride

* * * * *